United States Patent [19]

Couch

[11] Patent Number: 4,458,872

[45] Date of Patent: Jul. 10, 1984

[54] BRACKET ASSEMBLY

[76] Inventor: Jim Couch, 12850 Bracken St., Arleta, Calif. 91331

[21] Appl. No.: 350,343

[22] Filed: Feb. 19, 1982

[51] Int. Cl.³ .............................................. A47G 1/16
[52] U.S. Cl. ................................. 248/497; 211/192; 24/573; 248/222.1; 248/223.1
[58] Field of Search .......... 24/213 B, 230 AS, 230 A; 248/224.4, 222.1, 223.1, 497, 487, 489; 292/DIG. 14; 211/192; 403/303, 319, 49, 154, 155

[56] References Cited

U.S. PATENT DOCUMENTS

| | | | |
|---|---|---|---|
| 2,126,630 | 9/1938 | Gleitsman | 248/547 |
| 2,577,526 | 12/1951 | Kelly | 248/498 X |
| 3,135,489 | 6/1964 | Gledhill | 248/223.4 |
| 3,491,820 | 1/1970 | Ostling | 248/221.3 X |
| 4,176,580 | 12/1979 | Gallegos | 248/224.1 X |

Primary Examiner—Ramon S. Britts
Assistant Examiner—Sarah A. Lechok
Attorney, Agent, or Firm—Frank L. Zugelter

[57] ABSTRACT

The invention comprises a two-member bracket assembly each member cooperating with the other. A locking effect is produced on an article, such as a screw or bolt, securely mounted in a wall or the like. The first member includes a bight that is securely mounted to a frame or the like that is to hang on the wall. The bight via an aperture in it is thrust over, say, the screw-head of, the article in the wall. The second member cooperates by engaging the bight in the latter's cavity, sliding therealong and into a position on such article to lock the bracket assembly to such article. This locking effect is obtained by the second member including sections which define a slot that clips on to the article, say, behind the shoulder of the screw-head in the example above, that has been thrust through the aperture of the bight.

26 Claims, 9 Drawing Figures

BRACKET ASSEMBLY

[TECHNICAL FIELD]

This invention relates to a bracket assembly, and in particular, to one for mounting a frame or the like to a wall or the like.

PRIOR ART AND PROBLEMS [BACKGROUND ART]

Heretofore, the mounting of a picture, or the like, such as a collector's plate, in its frame upon a wall has been a shaky situation. When a sufficient force struck the mounted frame and its picture, collector's plate, etc., both would be released from the mounting assembly such as a bolt, nail, or other known state-of-the-art bracket. Falling, they would be damaged. The valuableness of such article would be adversely affected by physical damage thereto.

None of the known brackets seem to have the ability to lock frame and picture, etc., in position on the wall, so that in the event a force, such as an earthquake or an accidental human body motion, were to strike frame and/or picture, etc., they would remain in place on the wall or the like, short of the wall falling down.

Background art which, as far as known to the applicant, and which can be regarded as useful for the understanding of the invention, discloses various brackets and bracket assemblies is as follows: U.S. Pat. Nos. 1,246,749; 2,126,630; 2,559,099; 2,577,526; 2,901,303; 3,036,803; 3,337,172; 3,491,820; 4,097,014; and foreign patents: British No. 16,946 [A.D. 1915]; British No. 133,590, of Oct. 16, 1919; and German No. 397,957 of July 10, 1924. These prior art teachings were developed in a preliminary novelty search. None of these teachings disclose the claimed features of this invention.

DISCLOSURE OF THE INVENTION

This invention comprises a two-member assembly, each member co-operating with the other, to produce a locking effect on an article, such as a screw or bolt, securely mounted in a wall or the like. Its first member in the form of a bight is secured or securely mounted to a frame or the like which is to hang on the wall. After the bight via an aperture therein is thrust upon and over a shoulder of such article, the second member cooperates by engaging the bight in its cavity and by sliding therealong and into a position on such article behind its shoulder so as to lock the bracket or assembly to the article. The second member includes sections which define a slot that clips on to the article behind its shoulder that has been thrust through the aperture of the bight.

An object of this invention is to provide a novel, useful and non-obvious bracket assembly which securely locks a frame or the like to an article securely mounted in a wall or the like.

Another object of this invention is to prevent a pulling loose of a frame or the like from its mounted position on a wall or the like.

Another object of this invention is to prevent damage to a picture, collector's plate, etc., supported by a frame or the like when the latter is mounted to such an article or the like.

Another object of this invention is to provide a bracket assembly inexpensive to make, efficient in its operative use or mode of use, and easy in assembling for such use.

These and other objects and advantages of the invention will become more apparent by a full and complete reading of the following description, the claims appended thereto, and the accompanying drawing comprising two sheets showing illustrations of different embodiments of the invention.

BEST MODE(S) OF CARRYING OUT THE INVENTION

Figure 1:
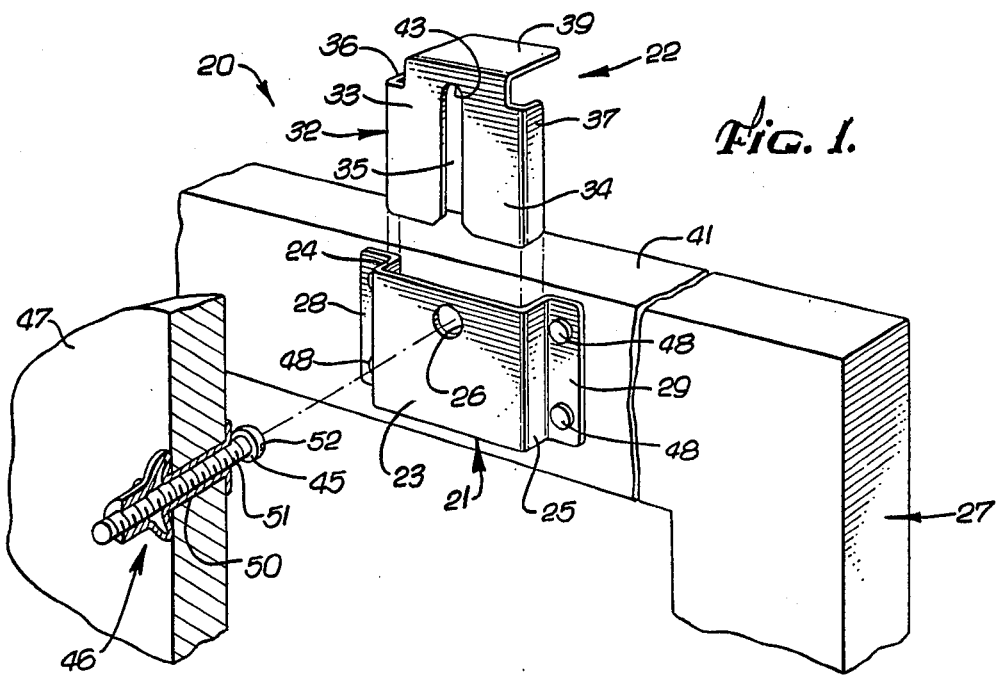
FIG. 1 is an exploded perspective view, showing one embodiment of the invention in an unassembled relationship and shown in a context or environment preparatory to utilization of the invention.

Referring now to the drawing and its FIGURES in which reference characters therein correspond to like numerals hereinafter, the numeral 20 refers to a bracket assembly shown in FIG. 1. The assembly's elements generally comprise two elements, members 21, 22, with member 22, in its operative mode of use engaging in a flush manner the member 21. The first member 21 comprises a body portion or bight 23, preferably of flat rectangular configuration and in which depending legs 24, 25 are respectively joined or mounted to, and preferably integrally formed with and from, the opposing side edges of bight 23. An aperture 26 is provided in bight 23. Means are provided for bight 23 whereby member 21 is made attachable to a frame 27 or the like. Flanges 28, 29 are respectively joined, in this configuration, to legs 24, 25, and preferably integrally formed therewith, although they may be attached directly to bight 23 where the latter is not formed in a flat configuration. The vertically-aligned dimensions of bight 23, legs 24, 25 and flanges 28, 29 are preferably co-extensive with one another. In whatever form member 21 takes, a cavity is developed or generated for bight 23.

The member 22 of assembly 20 connotes a clip-like element, and comprises a plate 32 divided into two sections 33, 34 to thereby define a slot 35. Each of the pair of spacing means 36, 37, here in the form of flanges, is joined or mounted to, preferably integrally therewith, a respective one of sections 33, 34, and extends in the same direction, towards frame 27, as legs 24, 25 do relative to bight 23. Spacing means 36, 37 become operative after member 21 is securely mounted to frame 27 or the like. A tab member 39 is joined or mounted to, preferably integrally therewith, plate 32, along a top edge thereof disposed between members 36, 37, and extends generally in the same direction as those members. In operative use of assembly 20, the tab 39 is adapted to preferably seat or rest on the top of frame 29, and provides the means for engaging member 22 to member 21 in its mode of use, by grasping same with one's fingers to introduce or withdraw the one member from the other.

The slot 35 includes preferably an open end formed at a bottom edge of plate 32, extending thereinto to generate the sections 33, 34. A closed end 43 [FIG. 1] is provided for slot 35. In assembled relationship of member 22 to member 21, the slot 35 is in alignment with aperture 26 in bight 23. The width or dimension 44 [FIG. 3] of slot 35 is of a dimension less than the dimension of aperture 26 and of a shoulder 45 [FIG. 3] of a means or article 46 secured in a wall 47 thrust through aperture 26, this becoming more apparent hereinafter in the description.

The members 36, 37 conveniently space plate 32 from the backside of frame 27 to which member 21 is secured in use, to effect a sliding engagement for member 22 in its assembling with member 21. The widths of sections 33, 34 fit snugly against legs 24, 25 to guide the slot into alignment with aperture 26. The preferred construction of sections 33, 34 and members 36, 37 provide a continuous width thereof throughout their lengths. The widths of members 36, 37 are of the same general measurement as the widths for legs 24, 25 on member 21, so that such spacing means 36, 37 become operative upon securement of member 21 to frame 29, i.e., the spacing means' widths terminate at the plane of the backside of frame 29.

Generally, in assembling the two members 21 and 22, one to the other, tab 39 is held by one's fingers while introducing member 22, i.e., its plate 32, into the cavity of member 21. Alignment of slot 35 to aperture 26 is assured by the widths of sections 33, 34, and with a snug fit being produced between members 21, 22 and the backside of frame 27 as a result of the widths of members 36, 37.

Prior to assembling the two members 21, 22 for use in their operative mode, member 21 first is securely mounted to the backside of a frame 27 by means of nails 48 or the like, each of which being thrust through a suitable hole conveniently located or disposed in flanges 28, 29 and nailed to frame 27, as shown in FIG. 1. Before member 21 is nailed to frame 27, member 22 may be held against frame 27 as if in its operative-mode position and in the cavity of member 21 with its tab 39 seated against the top edge of frame 27. Then, the position of aperture 26 is correlated or aligned with the closed end of slot 35, although such aperture 26 may appear at any position along the length of slot 35. A pencil marking may be utilized through the holes in flanges 28, 29 to locate the nailing positions on frame 27.

Further, before member 22 is mounted to member 21 in an operative-mode assembly, wall 47 itself is prepared to accept bracket assembly 20 with frame 27 connected thereto.

Figure 2:
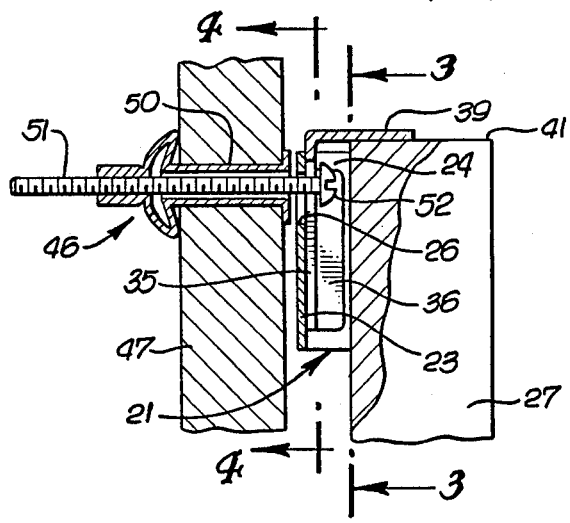
FIG. 2 is a sectional view of the embodiment shown in FIG. 1, but in an assembled relationship and in an operative-use mode.

As shown in FIGS. 1 and 2, a "molly bolt" assembly or article 46 is illustrated as being in secured position in wall 47. Such a device is well known in the art. It includes an interiorly threaded sleeve 50 to which a threaded element 51 is threaded. The shoulder 45 is to be found at the base of a head 52 mounted on screw 51.

It is over this shoulder 45 that aperture 26 in bight 23 is thrust in the mounting of frame 27 to wall 47.

Figure 3:
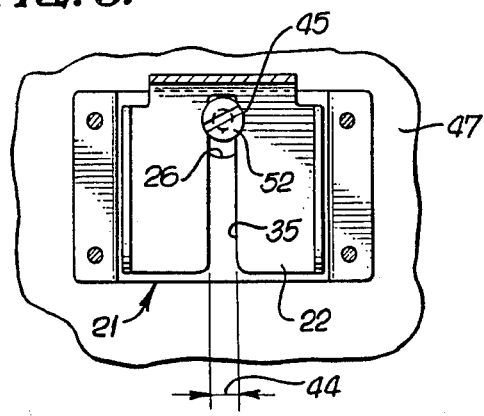
FIG. 3 is a view taken on line 3—3 of FIG. 2.
Figure 4:
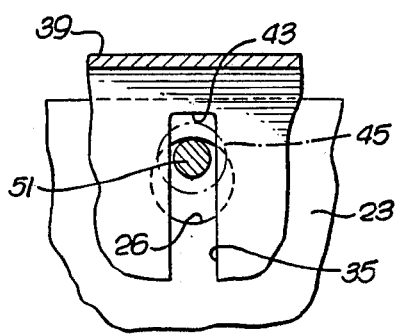
FIG. 4 is a view taken on line 4—4 of FIG. 2.

Assembled bracket 20 is shown in operative mode in FIGS. 2, 3, and 4, in relation to the securing means 46 already mounted on wall 47, i.e., in locked position on securing means 46. To gain such mode, aperture 26 in bight 23 is thrust over shoulder 45, after which member 22 is introduced into the cavity of member 21. The spacing members 36, 37 on member 22 cause the slot 35 to be positioned on screw 51 between shoulder 45 and bight 23. [The head 52 on screw 51 has been adjusted to its position so that the thickness of sections 33, 34 fits between shoulder 45 and bight 23.] As tab 39 progresses downwardly to its seat on top edge 41 of frame 27, the width of slot 35, being less than the diameter or dimension of aperture 26, prevents the withdrawal of bight 23 from screw 51, by reason of it being of less dimension than that of aperture 26 and shoulder 45.

FIG. 3 shows clip-like member 22 in its assembled position to bight 23, with assembly 20 in locked position on wall 47. The closed end 43 of slot 35 does not lie directly behind head 52 or shoulder 45 as do the portions of the opposing edges of sections 33, 34. However, such end 43 nevertheless is included as part of defined slot 35. It is apparent from FIGS. 3 and 4 that closed end 43 may or may not lie directly behind shoulder 45 (shown in phantom in FIG. 4), in the actual manufactured members 21, 22. It is to be understood that closed end 43 could function, with or without the use of the side-opposing edges forming the length of slot 35, to prevent aperture 26 from being withdrawn from shoulder 45.

Figure 5:
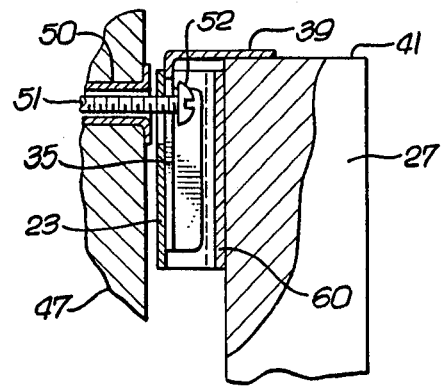
FIG. 5 is a sectional view of another embodiment of the invention.

FIG. 5 is a modification of the embodiment shown in FIGS. 1–4. Here a positioning means 60 in the form of a plate member is secured, such as by spot welding, across flanges 28, 29, enclosing generally the cavity of bight 23 within member 21 itself, and functions to immediately position member 22 in assembling relationship to member 21. Suitable holes in the plate member are aligned with the holes in flanges 28, 29 for nails 48.

Figure 6:
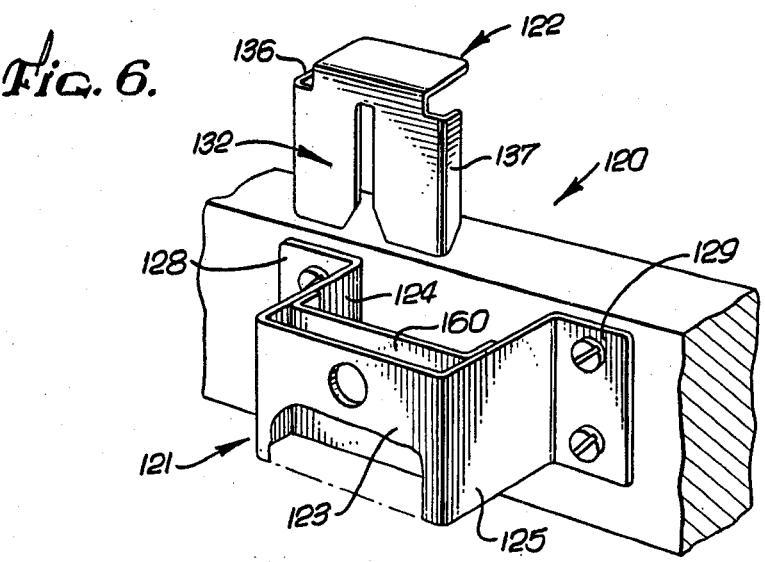
FIG. 6 is a perspective view of still another embodiment of the invention in an unassembled relationship and shown in a context or environment preparatory to utilization of the invention.
Figure 7:
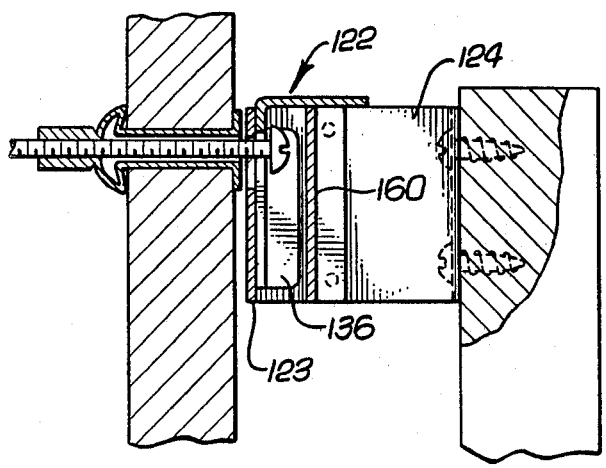
FIG. 7 is a sectional view of the embodiment of FIG. 6, but in an assembled relationship and in its operative-use mode.

Another embodiment of the invention is illustrated in FIGS. 6 and 7. A bracket assembly 120 includes deeper or wider legs 124, 125 connecting flanges 128, 129 to bight 123 of member 121. A stop member or plate 160 is secured, such as by spot welding, to legs 124, 125 in generally parallel fashion to bight 123 and mounted at a distance therefrom, i.e., positioned at a distance from bight 123 which substantially equals the width of spacer elements 136, 137 on plate member 132 of member 122. In this manner, plate 160 positions or spaces member 122 in proper assembling relationship to member 121 with which it cooperates in assembly. An engaging, sliding arrangement of plate 132 to bight 123 is assured in assembling, as well as providing rigidity for member 121. This embodiment is adapted for hanging heavier frames, as for example, to be found in encompassing large oil paintings or the like.

Figure 8:
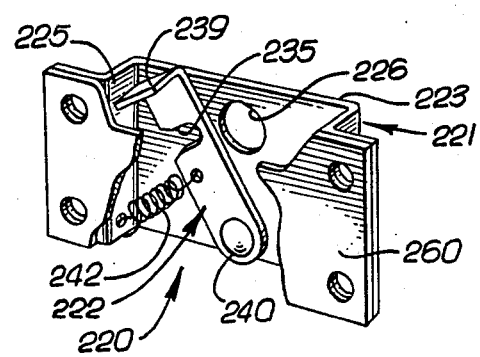
FIG. 8 is a perspective view of still a further embodiment of the invention, with one element broken away to show all elements of the embodiment.
Figure 9:
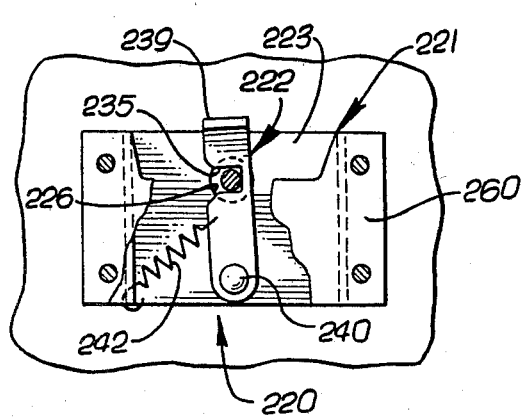
FIG. 9 is a frontal view of the view of FIG. 8, however, its elements are shown in operative-use mode.

FIGS. 8 and 9 illustrate another embodiment 220 of the inventive concept. Here, a slot 235 is provided in a clip-like element 222 which is pivotally mounted along its one side edge, as at 240, to the interior wall of a bight 223 forming part of a member 221. In other words, clip-like element 222 is not disengageable from its sliding engagement with member 221. Slot 235 aligns with aperture 226 in bight 223 of member 221 upon pivotal movement with its element 222 across the interior wall of bight 223. Its pivotal movement is biased across aperture 226 by a means 242, such as a coiled spring 242 shown in FIGS. 8, 9, operatively connected between clip-like element 222 and member 221. Here, the coiled spring 242 has its one end attached to element 222 between its slot 235 and the pivot point 240 and its other end attached near the bottom of and to the leg 225 of member 221. I.e., means 245 is operatively connected in such a manner that its biasing effect causes the drawing of slot 235 across aperture 226. Thus, the means 245 is operatively connected to elements in the assembly to do just that. For, example, means 242 can be attached to a flat plate member 260 similar to plate 60 of FIG. 2. Or, small tabs [not shown] with holes can be scored and cut from marginal portions of plate 260 or leg 225, say, near or adjacent to their respective bottom edges, and bent inwardly into the bight's cavity, to thereby provide an attaching point or means for the coiled spring 242.

A finger tab 239 is mounted, preferably integrally with, along the edge of member 222 opposite the edge at which or near the pivot point is located. Tab 239 provides a means to pivot member 222 across aperture 228. Tab 239 extends in a direction towards plate 260. In operation, tab 239 is grasped by an operator's finger, pulled in or pushed in a direction against the biasing effect of means 242, after which aperture 226 is thrust over a shoulder [not shown] securely mounted to a wall or the like, and after which tab 239 is released so that slot 235 engages a shank or the like from which the shoulder extends, to thereby lock assembly 220 in position on the wall or the like.

Disassembling of each of the described embodiments is readily apparent. However, briefly, it will be seen that the finger tab in each embodiment is grasped, pulled or pushed, to remove its associated slot from its respective screw element. The corresponding member slides out of co-operative relationship with its corresponding bight. Thereafter, the aperture on such bight is drawn over the shoulder mounted on the screw element or the like, and the two members are now separated.

Any suitable material, such as for example, aluminum, or plate [using known injection molding techniques], is utilized in the manufacture of the invention. State-of-the-art manufacturing processes are available and known to design, measure, stamp out, score, cut, bend, drill, rivet, or otherwise fabricate the components making up the elements of the respectively described embodiments.

Industrial Applicability

The invention is used in homes, offices, factories, wherever a need to hang a frame or the like on a wall or the like arises. It is made and used in accordance with the above description.

Various changes and modifications may be made and which lie within the ordinary skill of the mechanic in the art to which this invention pertains, without departing from the spirit and/or the scope of the appended claims.

Therefore, I claim:

1. In a bracket assembly comprising at least two members, the first member including a bight forming a cavity and having an aperture therein for passage therethrough of a shoulder on an article adaptable for mounting to a wall or the like and means for operatively connecting said bight to a frame or the like, wherein the improvement comprises the second member being of a clip-like nature mountable in the cavity of and to said bight in an engaging, sliding relationship, said second member including two sections defining opposing edges between which is disposed a slot, said sections, edges and slot extending in the same general direction as the direction by which said second member is assembled in engaging relationship to said bight, the aperture and slot being in alignment upon such assembly, the slot having a dimension along its length less than that of the aperture, whereby in the assembly of said two members, the lesser dimension of the slot clips on to the article behind its shoulder to lock article and assembly together.

2. In the bracket assembly of claim 1 wherein the slot is open at a bottom edge for said second member.

3. In the bracket assembly of claim 2, the clip-like member having side edges along one of which it is pivotally mounted in the cavity to said bight, such pivotal mounting providing the engaging and sliding relationship between said members, the open slot being aligned with the aperture of said bight in the operative mode of use of the assembly.

4. In the bracket assembly of claim 3, biasing means connecting the clip-like member to said first member to thereby bias its open slot towards the aperture of said bight so that after the shoulder of the article has been thrust sufficiently through such aperture the assembly is locked on the article by such slot being positioned behind such shoulder.

5. In the bracket assembly of claim 4, a finger tab mounted on the side edge of the clip-like member opposing the side edge along which such member is pivotally mounted to said first member.

6. In the bracket assembly of claim 5, said operatively connecting means including a pair of flanges and a pair of legs respectively mounted on said flanges, said pair of legs respectively mounted to said bight, said biasing means being attached between the clip-like member and one of said legs whereby the open slot in the clip-like member is drawn across the aperture of said bight.

7. In the bracket assembly of claim 1, means for spacing the sections of the clip-like member into engaging, sliding relationship against said bight, becoming operative upon adaptation of said first member to a frame or the like.

8. In the bracket assembly of claim 7 said spacing means comprising a flange mounted on at least one of said sections and extending in a direction to the frame or the like to which said first member is to be adapted.

9. In the bracket assembly of claim 1 wherein said operatively connecting means comprises a pair of flanges and a pair of legs respectively mounted on said flanges, said legs mounted to said bight, means for positioning said spacing means mounted to and between said pair of legs so that said clip-like member is in an engaging, sliding relationship against said bight upon insertion thereof into the cavity of said first member.

10. In the bracket assembly of claim 9 wherein said positioning means comprises a flat member.

11. In the bracket assembly of claim 1 or claim 7 or claim 8 or claim 9 or claim 10, a finger tab mounted on a top edge of said clip-like member.

12. In the bracket assembly of claim 1 or claim 2 or claim 3 or claim 4 or claim 5 or claim 6 or claim 7 or claim 8, a rigid member securely mounted across said operatively connecting means.

13. In the bracket assembly of claim 12 wherein said operatively connecting means includes flanges mounted on said first member, said rigid member being attached to and across said flanges.

14. A bracket assembly comprising in combination, two members,
the first member including a bight forming a cavity and having an aperture therein for passage therethrough of a shoulder on an article adapted for mounting to a wall or the like and means for operatively connecting said bight to a frame or the like,
the second member being of a clip-like nature mountable in the cavity of and to be mounted to said bight in an engaging, sliding relationship,
said second member including two sections defining opposing edges between which is disposed a slot, said sections, edges and slot extending in the same general direction as the direction by which said second member is assembled in engaging relationship to said bight,
the aperture and slot being in alignment upon such assembly,
the slot having a dimension along its length less than that of the aperture,
whereby in the assembly of said two members, the lesser dimension of the slot clips on to the article behind its shoulder to lock article and assembly together.

15. The bracket assembly of claim 14 wherein the slot is open at a bottom edge for said second member.

16. The bracket assembly of claim 15 wherein said clip-like member has side eges along one of which it is pivotally mounted in the cavity to said bight, such pivotal mounting providing the engaging and sliding relationship between said members, the open slot being aligned with the aperture of said bight in the operative mode of use of the assembly.

17. The bracket assembly of claim 16 including biasing means connecting the clip-like member to said first member to thereby bias its open slot towards the aperture of said bight so that after the shoulder of the article has been thrust sufficiently through such aperture the assembly is locked on the article by such slot being positioned behind such shoulder.

18. The bracket assembly of claim 17 including a finger tab mounted on the side edge of the clip-like member opposing the side edge along which such member is pivotally mounted to said first member.

19. The bracket assembly of claim 18 wherein said operatively connecting means includes a pair of flanges and a pair of legs respectively mounted on said flanges, said pair of legs mounted to said bight, said biasing means being attached between the clip-like member and one of said legs whereby the open slot in the clip-like member is drawn across the aperture of said bight.

20. The bracket assembly of claim 14 including means for spacing the sections of the clip-like member into engaging, sliding relationship against said bight, becoming operative upon adaptation of said first member to a frame or the like.

21. The bracket assembly of claim 20 wherein said spacing means comprises a flange mounted on at least one of said sections and extending in a direction to the frame or the like to which said first member is to to be adapted.

22. The bracket assembly of claim 14 wherein said operatively connecting means comprises a pair of flanges and a pair of legs respectively mounted on said flanges, said legs mounted to said bight, and includes
means for positioning said spacing means mounted to and between said pair of legs so that said clip-like member is in an engaging, sliding relationship against said bight upon insertion thereof into the cavity of said first member.

23. The bracket assembly of claim 22 wherein said positioning means comprises a flat member.

24. The bracket assembly of claim 14 or claim 20 or claim 21 or claim 22 or claim 23 including a finger tab mounted on the top edge of said clip-like member.

25. The bracket assembly of claim 14 or claim 15 or claim 16 or claim 17 or claim 18 or claim 19 or claim 20 including a rigid member securely mounted across said operatively connecting means.

26. The bracket assembly of claim 25 wherein said operatively connecting means includes flanges mounted on said first member, said rigid member being attached to and across said flanges.

* * * * *